July 27, 1937.  M. R. WARD  2,088,354
TRUCK SCALE
Filed Sept. 14, 1936   2 Sheets-Sheet 2

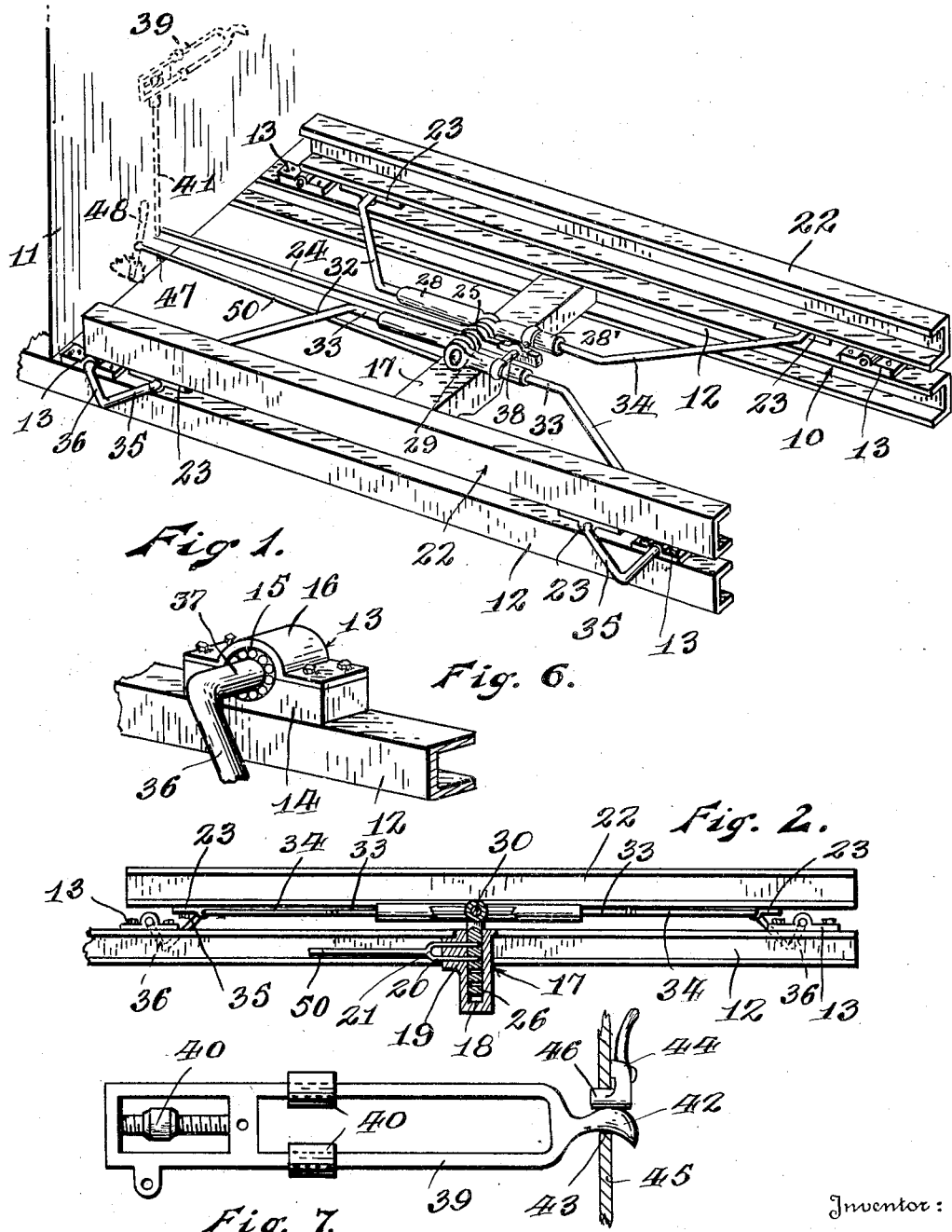

Inventor:
M. R. Ward,
By Christian R. Nielsen
Attorney.

Patented July 27, 1937

2,088,354

UNITED STATES PATENT OFFICE 2,088,354

TRUCK SCALE

Marion R. Ward, Goodson, Mo.

Application September 14, 1936, Serial No. 100,728

3 Claims. (Cl. 265—40)

My invention relates to weighing devices and more particularly to a weighing device associated with a motor vehicle truck or the like, and it consists in the constructions, arrangements and combinations herein described and claimed.

It is an object of the invention to provide a weighing device which may be readily installed upon a vehicle chassis whereby the load carried by the vehicle may be accurately determined, so as to prevent overloading of the vehicle, as well as assuring proper weight of a product to be delivered to a purchaser.

It is a further object of the invention to provide a structure in which the entire mechanism may be locked against movements, either before or after loading of the vehicle, thus preventing excessive wear of the parts during transit.

Figure 3:
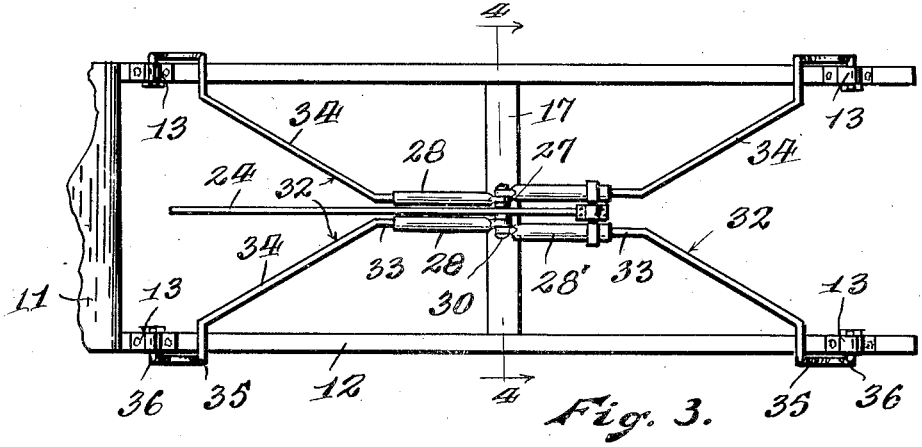
Figure 4:
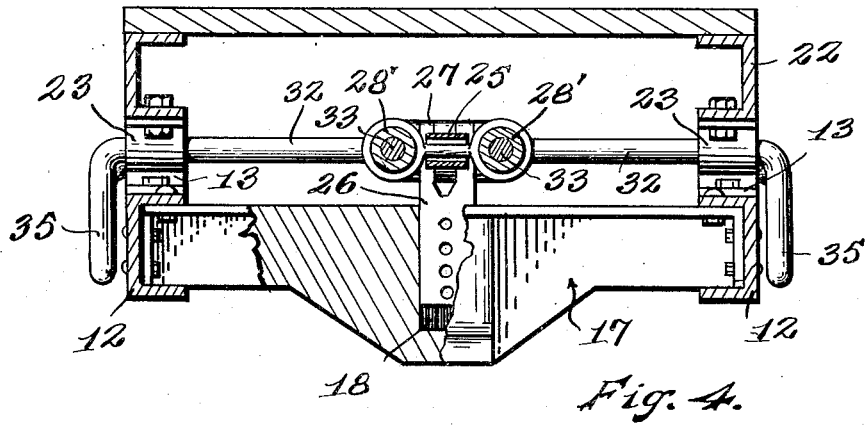

Additional objects, advantages and features of invention will be apparent from the following description considered in conjunction with the accompanying drawings, wherein, Figure 1 is a fragmentary perspective view of a truck chassis and cab having my invention installed thereon, Figure 2 is a fragmentary longitudinal sectional view, Figure 3 is a top plan view with the body frame removed, Figure 4 is a cross sectional view on the line 4—4 of Figure 3.

Figure 5:
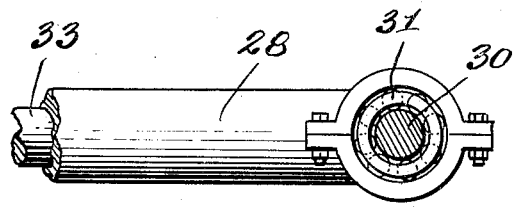

Figure 5 is a detail view illustrating the mounting of one of the actuator arms of the mechanism, Figure 6 is a perspective view of a further mounting for the arms, Figure 7 is a detail view of the scale beam employed in the device.

There is illustrated a motor truck chassis 10 including as is customary a cab 11. Upon the stringers 12 of the chassis at suitably spaced points longitudinally thereof, are bearing housings 13 which, as may be seen from Figure 6, comprise a base member 14 suitably bolted or otherwise secured to the stringers 12, and having semicircular portions within which a ball race 15 is housed, the race being secured therein by a cap 16.

The chassis includes a transversely extended beam 17, medially of which there is formed a vertically disposed well 18 adapted to receive a stud of the linkage constituting the scale, as will be explained hereinafter. That side of the beam 17 disposed toward the cab is provided with a boss 19 apertured to receive prongs 20 of a fork 21 for a purpose which will be apparent as the description proceeds.

The body frame 22 is positioned above the chassis 10 and upon the underside thereof, at points spaced inwardly of the bearings 13 there are mounted bearings 23 which may be of similar construction to the bearings 13, and function for interconnection between the chassis and the body frame, as well as support of the body frame.

The truck frame 22 is intended to move upwardly and downwardly with respect to the chassis 10, in order to impart proper movement to the scale beam 24, this action being attained through a linkage system, generally indicated at 25. The linkage system comprises a stud 26, the shank of which is reciprocable in the well 18, the upper end being provided with spaced apertured ears 27 forming a means for mounting of other levers of the system, as will now be explained. A pair of levers 28—28′ are provided, each having an ear 29 adapted to be aligned with the apertured ears 27 of the stud 26 and also aligned with an aperture in the scale beam 24 and through these aligned apertures there is a pivot bolt 30. If found necessary the apertures of the ears 29 and the scale beam 24 may be provided with ball or roller bearings, as clearly shown in Figure 5, in which, the ears are shown in the form of a separable bearing, housing a ball race 31, the bolt 30 extending through the race.

The levers 28—28′ are preferably cylindrical and hollow, the pair 28 opening toward the cab, while the pair 28′ open toward the rear of the truck, and telescopically arranged in each cylinder there is a rod 32. These rods are identical in construction and comprise a straight portion 33 reciprocable in respective cylinders and an angularly disposed reach 34. The reach 34 extends to a point opposite respective bearings 23 where it is extended at right angles through the bearing. At a point at the opposite side of the bearing, the rod is bent at an angle to form an arm 35. From the arm 35, a substantially right angularly disposed arm 36 is formed, the rod finally terminating in a wrist member 37 journalled in respective bearings 13.

In order that ample support may be afforded the scale beam 24, the cylinders 28′ have extended thereacross a support rod 38 which passes through a suitable aperture at the rear end of the beam 24. Any suitable anti-friction means may be installed between the rod and the beam. It is therefore obvious that the scale beam 24 will move in synchrony with the stud 26 of the linkage system.

A scale balance arm 39 is mounted in the cabin 11 in any approved manner and includes the usual balance weights 40, one end of the arm 39 being connected with a link 41 which in turn is connected with the scale beam 24. The balance arm 39 includes a pointer 42 disposed through a slot 43 for the purpose of indicating the weight or balance of the load, and in order that the balance arm may be held against undue movements when the vehicle is in transit, a locking lever 44 is mounted upon the frame 45 and includes a cam 46 positioned in the slot 43. Obviously, when the cam is moved into contacting relation with the pointer, the balance arm will be held against movement. The counterweights 40 are diagrammatically shown and obviously these will vary as to size depending on the capacity of the truck and loads to be weighted.

A locking mechanism, generally indicated at 47, is provided, and functions to maintain the linkage system against undue movements, during transit of the vehicle. This mechanism includes a hand lever and pawl 48, a ratchet 49 operable in conjunction therewith and a link 50 integrally connected with the fork 21. The prongs 20 are reciprocable through apertures in the boss 19 and the stud 26 is provided with spaced apertures adapted to align with the apertures of the boss and likewise the prongs 20. Obviously when the prongs are projected through the aligned apertures (as shown in Fig. 2) the stud and associated linkage will be held against movement.

The operation will be readily understood from the following description. When a vehicle is to be loaded, the locking device is moved to its released position and the material then placed in the body associated with the frame 22. As the weight increases, the frame will move downwardly toward the chassis 10, which movement is permitted, since the linkage system is pivotally supported in the bearings 23. During such movement, the stud 26 will move downwardly in the well 18, the levers 28—28' will partake of a slight pivotal movement on the bolt 30 and the rod portions 32 will have a longitudinal movement outwardly of the hollow cylindrical portions. Also, it will be apparent that the wrist portions 37 will have a rotative movement in the bearings 13. When these movements occur, a downward movement will also be imparted to the scale beam 24, which in turn moves the balance arm 39 to indicate the loadage. As soon as the required amount of material has been loaded into the vehicle, the lever 48 is moved to project the prongs 20 through aligned apertures to lock the linkage mechanism, and the cam is then moved to lock the balance arm, when the vehicle may be moved to its destination for unloading. When unloaded, the parts will return to normal position due to the angular relation of the pivotal connection between the chassis and body frame and the influence of the weights of the balance arm 39.

While I have shown and described a preferred construction, I am aware that changes may be made, and I therefore consider as my own, all such modifications as fairly fall within the scope of the appended claims.

I claim:

1. In a truck scale, a chassis, a body frame thereabove, bearing members on the chassis adjacent each end, bearing members on the truck frame, a transverse frame member on the chassis, said member having a well, a stud reciprocably mounted in the well, hollow lever members pivotally connected to the stud, a rod member telescopically arranged with each hollow lever, said rod members having a portion journaled in respective bearing members on the body frame and having a portion outwardly of the bearing bent to define two angularly extended arms, one of said arms having a wrist portion journalled in the bearing on the chassis, a scale beam connected with the stud member and movable therewith, and a balance arm connected with the scale beam.

2. In a truck scale, a chassis, a body frame thereover, bearing members on the chassis adjacent each end, bearing members on the truck frame, a transverse frame member on the chassis, said member having a well, a stud reciprocably mounted in the well, hollow lever members pivotally connected to the stud, a rod member telescopically arranged with each hollow lever, said rod members having a portion journalled in respective bearing members on the body frame, and having a portion outwardly of the bearings bent to define two angularly extended arms, one of said arms having a wrist portion journalled in the bearing on the chassis, a scale beam connected with the stud member and movable therewith, said stud member having a plurality of vertically spaced apertures, a fork member supported by the transverse member and having prongs adapted to project through the apertures for holding the stud against reciprocating movements, lever means for actuating the fork member, a balance arm connected with the scale beam, and cam means for locking the balance arm against movement.

3. In a truck scale, a chassis, a body frame thereabove, bearing members on the chassis adjacent each end, bearing members on the truck frame, a transverse frame member on the chassis, said member having a well, a stud reciprocably mounted in the well, extensible lever members pivotally connected to the stud and having a portion journalled in respective bearing members on the body frame and further having a portion outwardly of the bearings bent to define two angularly extended arms, one of said arms having a wrist portion journalled in a bearing on the chassis, a scale beam connected with the stud and movable therewith, and a balance arm connected with the scale beam.

MARION R. WARD.